United States Patent
Schmitt et al.

(10) Patent No.: US 10,598,213 B2
(45) Date of Patent: Mar. 24, 2020

(54) AXIAL BEARING

(71) Applicant: BMTS Technology GmbH & Co. KG, Stuttgart (DE)

(72) Inventors: Steffen Schmitt, Ditzingen (DE); Ruediger Kleinschmidt, Besigheim (DE); Steffen Heinemann, Stuttgart (DE); Oliver Kuhne, Stuttgart (DE)

(73) Assignee: BMTS Technology GmbH & Co. KG (DE)

( * ) Notice: Subject to any disclaimer, the term of this patent is extended or adjusted under 35 U.S.C. 154(b) by 0 days.

(21) Appl. No.: 16/268,073

(22) Filed: Feb. 5, 2019

(65) Prior Publication Data

US 2019/0242429 A1    Aug. 8, 2019

(30) Foreign Application Priority Data

Feb. 8, 2018   (DE) .................. 10 2018 201 963

(51) Int. Cl.
*F16C 17/04* (2006.01)
*F16C 33/10* (2006.01)

(52) U.S. Cl.
CPC ........ *F16C 17/047* (2013.01); *F16C 33/1075* (2013.01); *F16C 2240/30* (2013.01); *F16C 2240/44* (2013.01); *F16C 2360/24* (2013.01)

(58) Field of Classification Search
CPC . F16C 17/047; F16C 33/1075; F16C 2360/24
See application file for complete search history.

(56) References Cited

U.S. PATENT DOCUMENTS

| 4,362,343 | A | * | 12/1982 | Visser ................ F16C 17/045 384/123 |
| 4,639,148 | A | | 1/1987 | Tamura et al. |
| 5,529,399 | A | * | 6/1996 | Holze ................. F16C 17/10 384/107 |
| 6,024,495 | A | | 2/2000 | Loos et al. |
| 7,470,064 | B2 | | 12/2008 | Link et al. |
| 8,317,400 | B2 | | 11/2012 | Petitjean et al. |
| 9,574,458 | B1 | * | 2/2017 | Moscetti ............... F01D 25/162 |
| 10,072,707 | B2 | | 9/2018 | Futae et al. |
| 2014/0233873 | A1 | | 8/2014 | Hayashi et al. |

FOREIGN PATENT DOCUMENTS

| DE | 196 41 673 B4 | 9/2005 |
| EP | 1 644 647 B1 | 10/2006 |
| EP | 2163731 A1 | 3/2010 |
| EP | 3 091 242 A1 | 11/2016 |

OTHER PUBLICATIONS

German search report dated Jan. 18, 2019.
English abstract for EP-3 091 242.

* cited by examiner

*Primary Examiner* — Thomas R Hannon
(74) *Attorney, Agent, or Firm* — Fishman Stewart PLLC

(57) ABSTRACT

An axial bearing may include a body having a disk-form configuration, a centrally disposed passage opening extending axially into the body structured to receive a shaft, and at least one circular segmental oil pocket opening towards the passage opening. The at least one oil pocket, in both circumferential directions relative to the body, may transition into a plateau surface section directly adjoining the at least one oil pocket.

18 Claims, 2 Drawing Sheets

AXIAL BEARING

CROSS-REFERENCE TO RELATED APPLICATION

This application claims priority to German Application No. DE 10 2018 201 963.0, filed on Feb. 8, 2018, the contents of which are hereby incorporated by reference in its entirety.

TECHNICAL FIELD

The present invention concerns an axial bearing, in particular for an exhaust gas turbocharger, which has an essentially disk-form configuration and a centrally arranged passage opening for a shaft. The invention also concerns an exhaust gas turbocharger with such an axial bearing.

BACKGROUND

From DE 196 41 673 B4 an axial bearing of the generic kind for the mounting of a shaft with a bearing body fixedly connected to a bearing housing is of known art; in addition this has a bearing comb rotating with the shaft, together with at least one lubrication gap designed between the bearing body and the bearing comb, which is formed by a profiled annular surface and a plain sliding surface and is connected to a lubricating oil supply.

A cylindrical bearing body for a plain bearing with a lubricating groove is of known art from EP 3 091 242 A1, wherein at least one lubricating pocket for the distribution of lubricating oil onto the sliding pocket is provided on an inner sliding surface in the form of a jacket. Here a lubricant supply channel leads to each lubricating pocket, which channel passes through the bearing body and is designed so as to supply lubricant to the lubricating pocket. In addition at least one lubricating groove is associated with each lubricating pocket; this is formed in the sliding surface and extends from an edge of the sliding surface up to the associated lubricating pocket. By this means it is intended that a better plain bearing be created in terms of wear.

From EP 1 644 647 B1, an axial bearing of the generic kind is again of known art.

In general, axial bearings of known art, especially for exhaust gas turbochargers, have a comparatively complex component geometry and are therefore expensive to manufacture, since, for example, the tolerances are in the μm-range. By virtue of the oil pockets previously provided and the wedge surfaces adjoining them, which transition into associated plateau surfaces or detent surfaces, the axial bearings of known art up to the present time can also only be used for one direction of rotation, which means that there is always a risk of incorrect installation and associated damage. For this reason, axial bearings of this type have to date required comparatively high logistical and inspection costs.

SUMMARY

The present invention is therefore concerned with the problem of specifying an improved, or at least an alternative, embodiment for an axial bearing of the generic kind, which overcomes the disadvantages known from the state of the art.

This problem is solved in accordance with the invention by the subject matter of the independent claim(s). Advantageous embodiments are the subject matter of the dependent claim(s).

The present invention is based on the general concept that, for the first time, an axial bearing should indeed be designed with oil pockets, but without the wedge surfaces previously used. The elimination of the wedge surfaces that have always previously been provided means that the inventive axial bearing can not only be manufactured more easily and thus more cost-effectively, but also that there is no need for an enhanced checking effort when installing the axial bearing, since the latter can be used independently of the direction of rotation; this was not possible in the case of previous axial bearings with wedge surfaces and led to damage. The inventive axial bearing has a disk-form configuration and a centrally arranged passage opening for a shaft. In purely theoretical terms, the inventive axial bearing can also be designed as a combined axial/radial bearing, wherein in this case it has a cylindrical configuration. In accordance with the invention, at least one circular segmental oil pocket is now provided, which is open towards the passage opening and which, viewed in both circumferential directions, transitions into a directly adjoining, in particular circular segmental, plateau surface section. For the first time the wedge surface previously provided between the oil pocket and the plateau surface is no longer present. The resulting bearing geometry, which can be manufactured cost-effectively, can thus be used independently of the direction of rotation, and generates the oil film capable of bearing hydrodynamic loads as a result of the tilting motion of the system's planar counter-rotating disk. The wedge surfaces required to generate the hydrodynamic pressure build-up are thus adjusted dynamically by the tilting motion of the planar counter-rotating disk. This always occurs systemically by virtue of the radial clearances present in the radial bearing and the residual unbalance of a rotor.

In an advantageous further development of the inventive axial bearing, at least two, preferably three or more, circular segmental oil pockets are provided which, viewed in both circumferential directions, transition into two, preferably three or more, plateau surface sections arranged between the latter. The at least two oil pockets and the at least two plateau surface sections arranged between them in the circumferential direction can create a rotationally symmetrically uniform hydrostatic pressure, and can thus achieve an enhanced smoothness of running.

A maximum axial depth t of the at least one oil pocket of between 10 μm and 1000 μm is expedient. The said depth t is preferably between 20 μm and 150 μm. By virtue of the comparatively large range for the depth t of the oil pockets, even larger tolerances can in particular be tolerated without any negative bearing effects.

In another advantageous embodiment of the inventive solution the at least one oil pocket has straight radial edges and a curved outer edge, or else a continuously rounded-off outer edge. The alternative with the straight radial edges enables comparatively simple and thus also cost-effective manufacture, while the variant with the rounded-off outer edge offers the following advantages:

less deformation outside the oil pockets and thus better flatness/parallelism in the transition region (sealing function), simpler shaping die (otherwise corner/edge wear).

Very deep oil pockets with a depth t of approx. 0.3 mm would probably be particularly cost-effective because such oil pockets could then be inserted directly into a blank and the process step of shaping could be completely omitted. In addition, there would be no subsequent deformation as a result of shaping, and thus better flatness/parallelism.

In another advantageous embodiment of the inventive solution the at least one oil pocket has a pocket floor that is sloped in the radial direction, wherein a depth t increases radially inwards. This enables a build-up of pressure in the oil serving the bearing action in the outward radial direction from the oil pocket onto the surrounding plateau surface, wherein the plateau surface surrounds the plateau surface sections and the respective oil pockets in the outward radial direction. Here a transition between the oil pocket and the plateau surface located radially outward from the oil pocket can take place via an edge or else via a rounded-off transition, wherein the rounded-off transition in particular enables an improved oil supply from the oil pocket onto the plateau surface.

In another advantageous embodiment of the inventive solution, the at least one oil pocket covers a circumferential angle α and the at least one plateau surface section covers a circumferential angle β, wherein the following applies: $0.5\beta < \alpha < 2.0\beta$, or even, in particular, $\alpha = \beta$. The sizes of the circumferential angles α and β enable the size of the oil pockets and plateau surface sections, and thus the bearing properties of the axial bearing, to be individually adjusted to the particular requirements.

In another advantageous embodiment of the inventive solution, at least one oil inlet is provided which opens into the plateau surface, an oil pocket, or into the passage opening. In particular in the case of the at least one oil inlet opening into the passage opening or the oil pocket, uniform lubrication and thus a particularly good mounting of the shaft can be achieved by way of the inventive axial bearing, since the oil conveyed into the passage opening or the oil pocket is conveyed from a tilting planar counter-rotating disk, via the oil pocket, radially outwards onto the plateau surface. Needless to say, an additional oil inlet in the region of the plateau surface is also conceivable.

The present invention is further based on the general concept of mounting a shaft of an exhaust gas turbocharger by way of at least one such axial bearing, wherein the exhaust gas turbocharger in accordance with the invention has, in addition to the shaft, not only the axial bearing, but also an at least slightly tilting counter-rotating disk which, by virtue of its tilting motion, forms the wedge surface required to generate the hydrodynamic oil pressure. An exhaust gas turbocharger of this type can also be manufactured more simply and thus more cost-effectively by virtue of the axial bearing, which can be manufactured simply and inexpensively.

Further important features and advantages of the invention ensue from the subsidiary claims, from the figures, and from the related description with reference to the figures.

It is to be understood that the features mentioned above, and those yet to be explained below, can be used not only in the particular combination given, but also in other combinations, or in isolation, without departing from the scope of the present invention.

Preferred examples of embodiment of the invention are shown in the figures and are explained in more detail in the following description, wherein the same reference symbols refer to the same or similar or functionally identical components.

BRIEF DESCRIPTION OF THE DRAWINGS

Here, in schematic form.

DETAILED DESCRIPTION

Figure 1:
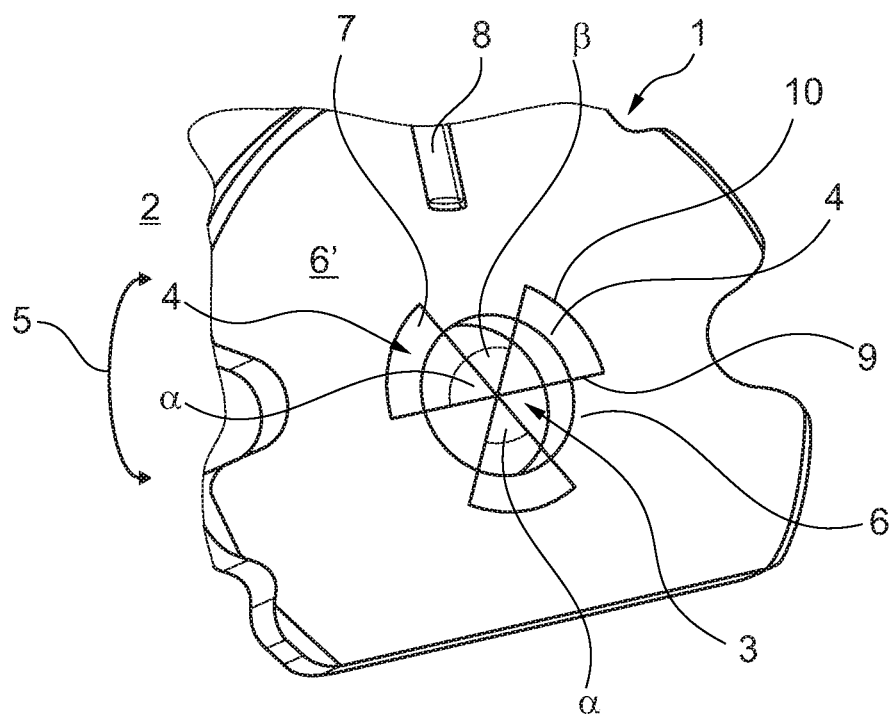
FIG. 1 shows a view of an axial bearing in accordance with the invention.

As shown in FIGS. 1 to 4, an inventive axial bearing 1, which can be used, for example, to support a shaft of an exhaust gas turbocharger 2, has an essentially disk-form configuration together with a centrally arranged passage opening 3 for the shaft. In purely theoretical terms, the inventive axial bearing 1 can also be designed as a combined axial/radial bearing 1, wherein in this case it has a cylindrical configuration. In accordance with the invention at least one circular segmental oil pocket 4 is now provided, in FIGS. 1 and 4 three such oil pockets 4 are provided in each case, which are designed so as to be open towards the passage opening 3 and, viewed in both circumferential directions 5, transition into plateau surface sections 6 that directly adjoin the pockets. In accordance with the embodiments of the inventive axial bearing 1 in FIGS. 1 and 4, three oil pockets 4 are provided, as are three plateau surface sections 6, arranged between them in the circumferential direction 5. The plateau surface sections 6 extend in the circumferential direction 5 between the individual oil pockets 4 and radially outside them into a plateau surface 6', whereby a comparatively large bearing or detent surface is available, which assumes the actual bearing task.

In contrast to axial bearings known from the prior art, the inventive axial bearing 1 no longer has any wedge surfaces, so that in the circumferential direction 5 the oil pockets 4 always transition directly into the surrounding plateau surface sections 6, which offers the great advantage that the inventive axial bearing 1 can be used independently of the direction of rotation. In the inventive axial bearing 1 the wedge surfaces required to generate the hydrodynamic oil pressure are achieved by a planar, counter-rotating disk (not shown), which creates the respective wedge surfaces by virtue of a tilting motion during operation of the exhaust gas turbocharger 2.

Figure 2:
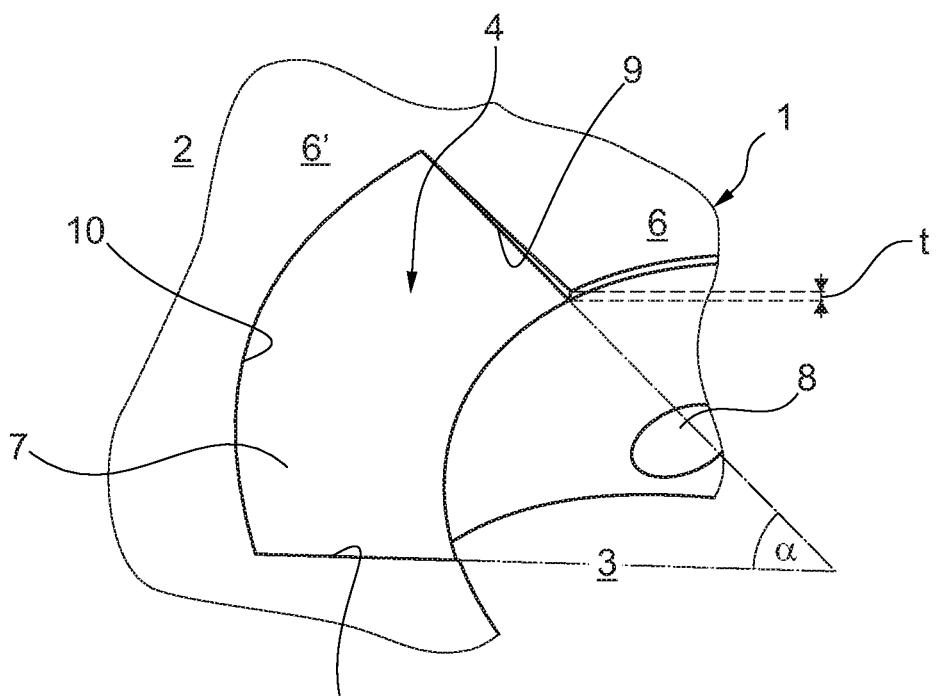
FIG. 2 shows a detail from FIG. 1 in the region of an oil pocket.
Figure 3:
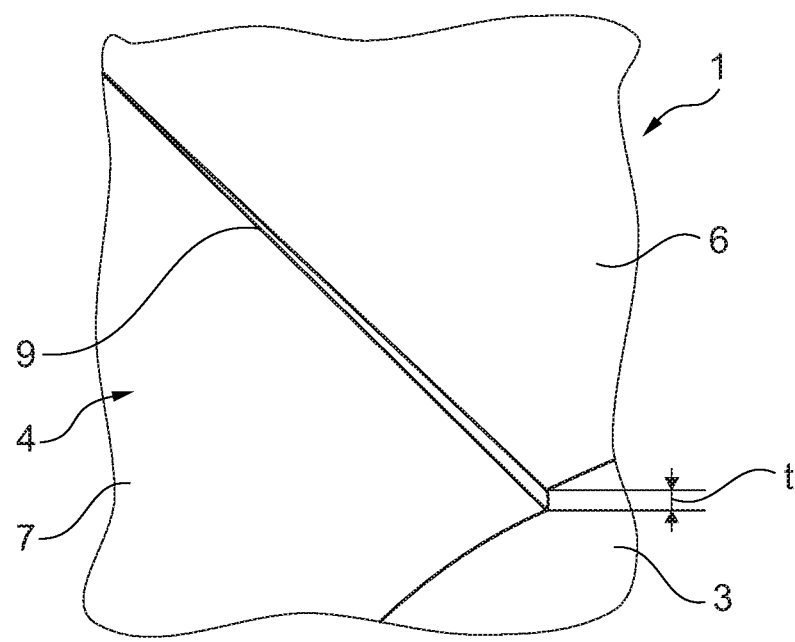
FIG. 3 shows a detail from FIG. 2 in the region of a transition between an oil pocket and an adjacent plateau surface.

A closer look at FIGS. 2 and 3 shows that a maximum axial depth t of at least one oil pocket 4 is between 10 μm and 1000 μm, preferably even in a much narrower range between 20 μm and 150 μm. This comparatively large possible range of depth t of the respective oil pockets 4 thus also enables comparatively large tolerances, which simplify the manufacture of the inventive axial bearing 1 and thus make it possible for it to be more cost-effective.

It can also be seen from FIGS. 2 and 3 that the at least one oil pocket 4 has a pocket floor 7 that is sloped in the radial direction, wherein the depth t increases radially inwards. This enables lubricating oil to be conveyed outwards solely due to the centrifugal forces occurring during operation, wherein in this case, the floor of the pocket 7 also represents a kind of wedge surface, which, in contrast to the axial bearings known up to the present time from the state of the art, rises not in the circumferential direction, but in the radial direction.

Looking again at FIG. 1, it can be seen that the at least one oil pocket 4 covers a circumferential angle α and the at least one plateau surface section 6 covers a circumferential angle β, wherein it is usually assumed that $0.5\beta < \alpha < 2.0\beta$. Here it is particularly preferred that the circumferential angles α and β are of the same size, so that the oil pockets 4 and the plateau surface sections 6 alternately extend the same distance in the circumferential direction 5.

Figure 4:
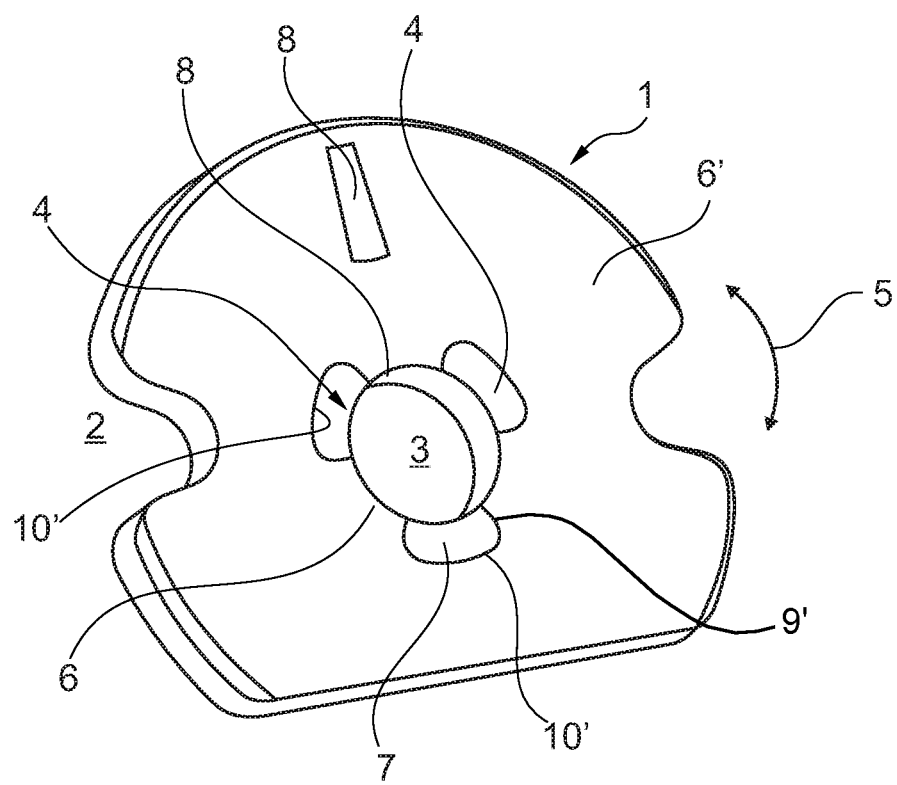
FIG. 4 shows a representation as in FIG. 3, but with differently configured oil pockets.

If FIGS. 2 and 4 are considered further, it can be seen that at least one oil inlet 8 is provided there, which, as shown in FIGS. 2 and 4, opens into the passage opening 3 and also, as shown in FIG. 4 into the plateau surface 6'. In particular the opening of the oil supply channel 8 into the passage opening 3 enables a lubricating film between a shaft arranged in the passage opening 3, which is then conveyed radially outwards via the oil pockets 4 onto the plateau surface 6'.

Here the oil film is conveyed by the counter-rotating disk, which forms the wedge surface required for oil conveyance by virtue of its tilting motion. The wedge surface generated by the counter-rotating disk by virtue of its tilting motion interacts with the plateau surface sections 6 and the plateau surface 6' of the axial bearing 1 and there generates the oil film effecting the bearing action.

Looking at the oil pockets 4 in FIGS. 1 to 3, it can be seen that the embodiment shown there has straight radial edges 9 and an outer edge 10 curved in the circumferential direction 5. In accordance with the axial bearing 1 shown in FIG. 4, the oil pocket 4 possesses a continuous rounded-off outer edge 10'. This can lead radially into the passage opening 3 in radial sections 9'. Here the radial edges 9, the outer edge 10 and/or the outer edge 10' can merge into the corresponding plateau surface 6' in an angled manner, or in a rounded-off manner, which in addition improves the generation of an oil film.

The alternative with the straight radial edges 9 enables a comparatively simple and thus also cost-effective manufacture, while the variant with the rounded-off outer edge 10 offers less deformation outside the oil pockets 4 and thus better flatness/parallelism in the transition region (sealing function), as well as a simpler shaping die.

Very deep oil pockets 4 with a depth t of approx. 0.3 mm would probably be particularly preferable, since they would be cost-effective, because such oil pockets 4 could be introduced directly into a blank and the process step of shaping could be completely omitted. In addition, there would be no subsequent deformation as a result of shaping and thus better flatness/parallelism.

In the case of the inventive axial bearing 1, this can be manufactured much more easily and thus more cost-effectively and moreover with the advantage that it can be installed independently of the direction of rotation. In particular this eliminates the checking requirements previously required during assembly.

The invention claimed is:

1. An axial bearing comprising:
   a body having a disk-form configuration;
   a centrally disposed passage opening extending axially into the body structured to receive a shaft;
   at least one circular segmental oil pocket opening towards the passage opening;
   wherein the at least one oil pocket, in both circumferential directions relative to the body, transitions into a plateau surface section directly adjoining the at least one oil pocket; and
   wherein the at least one oil pocket has a pocket floor that is sloped in a radial direction relative to the body, and wherein a depth of the at least one oil pocket increases radially inwards.

2. The axial bearing in accordance with claim 1, wherein the at least one oil pocket includes at least two circular segmental oil pockets which, in both circumferential directions, transition into two plateau surface sections arranged between the at least two oil pockets.

3. The axial bearing in accordance with claim 1, wherein at least one of:
   a maximum depth of the at least one oil pocket is 10 μm to 1,000 μm; and
   the maximum depth of the at least one oil pocket is 300 μm.

4. The axial bearing in accordance with claim 3, wherein the maximum depth of the at least one oil pocket is 20 μm to 150 μm.

5. The axial bearing in accordance with claim 1, wherein the at least one oil pocket has one of i) a plurality of straight radial edges extending radially relative to the body and a curved radially outer edge, and ii) a continuously rounded-off outer edge.

6. The axial bearing in accordance with claim 1, wherein the at least one oil pocket covers a circumferential angle α relative to the body and the plateau surface section covers a circumferential angle β relative to the body, and wherein α is from 0.5β to 2.0β.

7. The axial bearing in accordance with claim 1, wherein the at least one oil pocket covers a circumferential angle α relative to the body and the plateau surface section covers a circumferential angle β relative to the body, and wherein α=β.

8. The axial bearing in accordance with claim 1, further comprising at least one oil inlet opening into at least one of a plateau surface of the body, the at least one oil pocket, and the passage opening.

9. The axial bearing in accordance with claim 8, wherein the plateau surface circumferentially surrounds the at least one oil pocket and the plateau surface section in an outward radial direction relative to the body.

10. The axial bearing in accordance with claim 1, wherein the at least one oil pocket includes at least three circular segmental oil pockets which, in both circumferential directions, transition into three plateau surface sections arranged between the at least three oil pockets.

11. An exhaust gas turbocharger comprising a shaft, at least one axial bearing, and a planar counter-rotating disk, which, when in operation, via a tilting motion, together with the at least one axial bearing, provides an axial load-bearing oil film, the at least one axial bearing including:
    a disk-shaped body;
    a centrally disposed passage opening extending axially into the body structured to receive the shaft;
    at least one circular segmental oil pocket opening towards the passage opening;
    wherein the at least one oil pocket, in both circumferential directions relative to the body, transitions into a plateau surface section directly adjoining the at least one oil pocket; and
    wherein the at least one oil pocket has a pocket floor that is sloped in a radial direction relative to the body, and wherein a depth of the at least one oil pocket increases radially inwards.

12. The exhaust gas turbocharger in accordance with claim 11, wherein the at least one oil pocket includes a plurality of circular segmental oil pockets which, in both circumferential directions, transition into a plurality of plateau surface sections arranged between the plurality of oil pockets.

13. The exhaust gas turbocharger in accordance with claim 11, wherein the at least one oil pocket has one of i) a plurality of straight radial edges extending radially relative to the body and a curved radially outer edge, and ii) a continuously rounded-off outer edge.

14. The exhaust gas turbocharger in accordance with claim 11, wherein the at least one oil pocket covers a circumferential angle α relative to the body and the plateau surface section covers a circumferential angle β relative to the body, and wherein α is from 0.5β to 2.0β.

15. The exhaust gas turbocharger in accordance with claim 11, further comprising at least one oil inlet opening into at least one of a plateau surface of the body, the at least one oil pocket, and the passage opening, wherein the plateau surface circumferentially surrounds the at least one oil pocket and the plateau surface section in an outward radial direction relative to the body.

16. An axial bearing comprising:
a disk-shaped body;
a passage opening disposed centrally on the body and extending axially within the body, the passage opening structured to receive a shaft; and
a plurality of circular segmental oil pockets opening towards the passage opening, the plurality of oil pockets respectively having a pocket floor sloped in a radial direction relative to the body such that a respective depth of the plurality of oil pockets increases radially towards the passage opening; and
a plurality of plateau surface sections disposed circumferentially between the plurality of oil pockets;
wherein each of the plurality of oil pockets, in both circumferential directions relative to the body, transitions into a directly adjoining plateau surface section of the plurality of plateau surface sections.

17. The axial bearing in accordance with claim 16, wherein the plurality of oil pockets respectively have two straight radial edges extending radially relative to the body and a curved radially outer edge extending circumferentially therebetween.

18. The axial bearing in accordance with claim 16, wherein the plurality of oil pockets respectively have a continuously rounded-off outer edge including two radial sections extending radially into the passage opening relative to the body.

* * * * *